United States Patent
McAmish et al.

(10) Patent No.: US 6,818,083 B2
(45) Date of Patent: Nov. 16, 2004

(54) LAMINATED SHEET AND METHOD OF MAKING SAME

(75) Inventors: Larry Hughey McAmish, Springdale, OH (US); Kenneth L. Lilly, Lebanon, OH (US); Christopher Aaron Shelley, Cincinnati, OH (US); Arrigo D. Jezzi, Cincinnati, OH (US)

(73) Assignee: Clopay Plastic Products Company, Inc., Cincinnati, OH (US)

( * ) Notice: Subject to any disclaimer, the term of this patent is extended or adjusted under 35 U.S.C. 154(b) by 0 days.

(21) Appl. No.: 10/200,700

(22) Filed: Jul. 19, 2002

(65) Prior Publication Data

US 2003/0024625 A1 Feb. 6, 2003

Related U.S. Application Data

(60) Provisional application No. 60/306,699, filed on Jul. 20, 2001.

(51) Int. Cl.[7] ............................................. B29C 65/08
(52) U.S. Cl. ................. 156/73.1; 156/229; 156/244.11; 156/290; 156/308.4; 428/198
(58) Field of Search ............................... 156/73.1, 229, 156/242, 244.11, 290, 308.2, 308.4, 494, 495, 580, 580.1, 580.2, 581, 583.1; 428/114, 198, 221

(56) References Cited

U.S. PATENT DOCUMENTS

| | | | |
|---|---|---|---|
| 3,870,593 A | 3/1975 | Elton et al. | |
| 4,350,655 A | 9/1982 | Hoge | |
| 4,689,104 A | 8/1987 | Lavendel et al. | |
| 4,724,120 A | 2/1988 | Bienvenu et al. | |
| 5,196,247 A | 3/1993 | Wu et al. | |
| 5,202,173 A | 4/1993 | Wu et al. | |
| 5,221,039 A | 6/1993 | Jung et al. | |
| 5,254,111 A | 10/1993 | Cancio et al. | |
| 5,382,461 A | 1/1995 | Wu | |
| 5,407,979 A | 4/1995 | Wu et al. | |
| 5,422,172 A | 6/1995 | Wu et al. | |
| 5,424,025 A | 6/1995 | Hanschen et al. | |
| 5,592,690 A | 1/1997 | Wu et al. | |
| 5,763,041 A | 6/1998 | Leak et al. | |
| 5,851,937 A | 12/1998 | Wu et al. | |
| 5,861,074 A | 1/1999 | Wu | |
| 5,865,926 A | 2/1999 | Wu et al. | |
| 5,910,225 A | 6/1999 | McAmish et al. | |
| 6,013,151 A | 1/2000 | Wu et al. | |
| 6,066,221 A | 5/2000 | Marmon et al. | |
| 6,248,195 B1 | 6/2001 | Schmitz | |
| 6,255,236 B1 | 7/2001 | Cree et al. | |
| 6,265,045 B1 | 7/2001 | Mushaben | |
| 6,403,505 B1 | 6/2002 | Groitzsch et al. | |
| 6,475,591 B2 | 11/2002 | Mushaben | |
| 2003/0005999 A1 | 1/2003 | Wu et al. | |

FOREIGN PATENT DOCUMENTS

| | | |
|---|---|---|
| EP | 0418606 | 3/1991 |
| EP | 0936061 A2 | 8/1999 |
| GB | 2081155 A | 2/1982 |
| GB | 2285408 A | 7/1995 |
| WO | WO9843810 | 10/1998 |

*Primary Examiner*—James Sells
(74) *Attorney, Agent, or Firm*—Dinsmore & Shohl LLP

(57) ABSTRACT

A method of making a laminate sheet having a film layer and a fabric layer. The method includes the step of bonding a film layer to a fabric layer in order to form a laminate sheet such that the laminate sheet includes at least one high-bond region whereat the strength of the bond between the film and fabric layers is greater than other regions of the laminate sheet. The method further includes the step of stretching the laminate sheet such that the high-bond regions are either not stretched or are only partially stretched. A method of making a diaper backsheet, as well as a stretched laminate of a polymeric film and a fabric web, is also provided.

19 Claims, 4 Drawing Sheets

LAMINATED SHEET AND METHOD OF MAKING SAME

This application claims the benefit of Provisional Application No. 60/306,699 filed Jul. 20, 2001.

BACKGROUND OF THE INVENTION

Processes for the production of microporous films are well known in the art. For example, U.S. Pat. No. 3,870,593 (which is incorporated herein by reference) describes a process wherein a microporous film is produced by: (1) dispersing finely divided particles of a non-hygroscopic inorganic salt such as calcium carbonate in a polymer; (2) forming a film from the polymer; and (3) stretching the film to provide microporosity.

Methods of making composites of a microporous film and a nonwoven fabric are also known in the art. Such composites have been prepared by, for example, extrusion-coating a polymer film onto a nonwoven fabric. Prepared films and fabrics have also been bonded directly by a variety of means, including adhesive, thermal, and ultrasonic bonding.

It may also be desirable to stretch microporous film/fabric composites, however, stretching has its drawbacks. For instance, for microporous films, typical positive effects of stretching include higher vapor breathability and improved surface aesthetics. Vapor breathability (or water vapor transmission rate—"WVTR") can be estimated by laboratory test methods, and is a function of the size and frequency of micropores in the film. Additional stretching of an already microporous film is known to increase the size of existing pores and create new pores. Therefore, highly stretched microporous films and microporous film/fabric composites generally have higher vapor breathability as compared to similar materials which have been stretched to a lesser degree.

Likewise, surface feel and drapability are known to be improved by stretching processes. Films and fabrics, when combined with one another, tend to be more stiff and harsh than either of the individual components alone. Stretching such composites tends to break down the rigid structure, thereby providing a softer surface feel and improved drapability.

On the other hand, stretching microporous film/fabric composites can result in decreased bond strength and increased pinholing. Stretching improves the softness and drapability by destroying the connection between film and fabric. This results in decreased bond strength in the laminate. Stretching can also cause undesirable damage to the laminate, such as pinholing, tearing, or shredding of the film, the fabric, or the composite as a whole.

The bonding of a film and fabric may be carefully controlled to avoid creating other functional and aesthetic problems. For example, in the case of extrusion coating a polyethylene film onto a spunbond polypropylene web, process conditions such as melt temperature and nip pressure determine the intrusion of the fibers into the film structure. At the maximum level of intrusion, the film and fabric essentially mold together and become one. Such a laminate, however, acquires the worst properties of the two components and tends to be both rigid and fragile. At the minimum level of intrusion, however, the film and fabric have little or no bond, and therefore tend to delaminate. Too much bond strength is also known to limit the amount of stretching which may be performed due to pinhole formation. Simply stated, if the bond between film and fabric is too large, the stretched film will sometimes fracture prior to delaminating, leaving a pinhole.

Rather than bonding a microporous film to a fabric, it is also possible to first bond a non-porous film to a fabric, and then stretch the resulting composite in order to render the film microporous. Previous attempts to first bond and then stretch film/fabric composites, such as that disclosed in U.S. Pat. No. 5,910,225 (which is incorporated herein by reference) have been only partially successful due to damage to the composite by the stretching process. Damage includes, but is not limited to, pinholes, tears, and other functional and aesthetic defects.

U.S. Pat. No. 6,066,221 describes a method of providing increased bonding between a film and nonwoven by applying lanes of hot air to the surface of laminates in the machine direction. Although this zoned hot air knife treatment increases the structural integrity of the laminate, stretching of the treated laminate results in debonding of the film and nonwoven.

U.S. Pat. No. 6,248,195 is another example of a bonding technique that is unable to prevent debonding of the film and nonwoven during post-stretching. Schmitz teaches that heated fluid or air can be used to bond webs at localized points forming a broken lane in the machine direction of the film.

U.S. Pat. No. 5,424,025 describes zone stretching of a film in the machine direction through the use of interpenetrating male and female rolls. Variations in the depth of engagement by the male roll creates an alternating pattern of heavy and lightly stretched sections.

U.S. Pat. No. 6,013,151 (which is incorporated herein by reference) teaches that a film/nonwoven fabric laminate can be made microporous and breathable upon incremental stretching at high speeds. The resulting microporous laminates have a high water vapor transmission rate (WVTR). It has been found that a flat film/nonwoven laminate can be incrementally stretched more uniformly than an embossed film/nonwoven laminate. More uniform stretching provides higher WVTR and fewer pinholes.

There is a continuing need for improvements in the performance and appearance of composites of polymer films and nonwoven fabrics. In particular, improvements are desired for producing microporous film/fabric composites with higher breathability, while avoiding pin holes and other functional and aesthetic defects.

SUMMARY OF THE INVENTION

The present invention relates to film/fabric composites and methods of producing the same which exhibit improved physical and aesthetic properties. A fabric structure is laminated to a film in a novel manner and then stretched so as to produce a breathable composite satisfactory for many end uses as a liquid barrier having high water vapor permeability. The film and fabric layers are bonded in lanes running in the machine direction. The composite then passes through a special stretching device designed so that all of the web except the highly bonded lanes are stretched. This invention is suitable for hygiene applications, such as producing diaper backsheets, which require composites that do not delaminate, provide high WVTR (water vapor transmission rate), and are soft and cloth-like.

This invention is able to utilize the positive aspects described above and avoid the negative after effects. The fabric is attached to the film with two levels of bond strength. The majority of the bond may be extremely weak, thereby allowing the majority of the composite to be stretched to the maximum degree, thus obtaining the desired high WVTR readings and aesthetic properties (e.g., surface softness and drapability). Since there are zones where the bond is high, the total material will not be subject to delamination. The areas where the bond is high are not stretched or are only partially stretched and, therefore, the product will not suffer the problem of pinholes which are caused by stretching areas tightly bonded.

The films and fabrics described here can be composited in many different ways including, but not limited to, extrusion coating, adhesive lamination, and thermal point bonding. The composite once formed is then subjected to stretching using a variety of techniques including, but not limited to, CD intermeshing ring rolls. The process of stretching highly-filled thermoplastic polymer films using techniques such as ring rolls is known in the art. One example of this method is described in U.S. Pat. No. 4,350,655.

The film/fabric composite may be made, for example, by first attaching a fabric to a film during production of that film. The fabric can be bonded to the film at the nip point in a cast operation via extrusion coating. Other methods of bonding before or after the cast station nip include hot melt adhesive and thermal or ultrasonic point bonding. Any of these three methods, as well as many other methods not mentioned but well known in the art, can be used in accordance with the process described herein. The only requirement on bonding technique is that the locations where the fabric is highly bonded to the film can be avoided during the stretching process.

One method that meets the above criteria is where increased bonding in certain regions of the composite is accomplished by a sonic sealer that thermally bonds fabric to film in lanes running in the machine direction. The sealer can be located anywhere after the cast station nip point. In either case, the increased bonding results in lanes where the fabric cannot be delaminated from the fabric with less than 150 grams per linear inch of peeling force. The other criteria of avoiding or reducing stretching activation can be accomplished by using CD intermeshing ring rolls with spaces where the bonding lanes fall.

DETAILED DESCRIPTION OF THE INVENTION

The present invention provides a laminated sheet, as well as a method of making a laminated sheet, wherein the sheet includes a film layer and a fabric layer. The film layer is bonded to the fabric layer, and the laminate is then stretched. The film layer, however, is bonded to the fabric layer such that there are one or more high-bond regions (or lanes). During stretching, these high-bond regions either remain unstretched or are only partially stretched (i.e., are stretched less than other regions of the laminated sheet). In one particular embodiment, at least a portion of the film layer is microporous and is suitable for use as a diaper backsheet. For example, the film layer may include a pore initiator (such as an inorganic filler) so that, upon stretching, the film layer is rendered microporous (or its microporosity is increased upon stretching). Since the high-bond regions are unstretched (or are only partially stretched), the high-bond regions of the film layer may be non-microporous or may have reduced microporosity as compared to other regions of the film layer.

Figure 4:
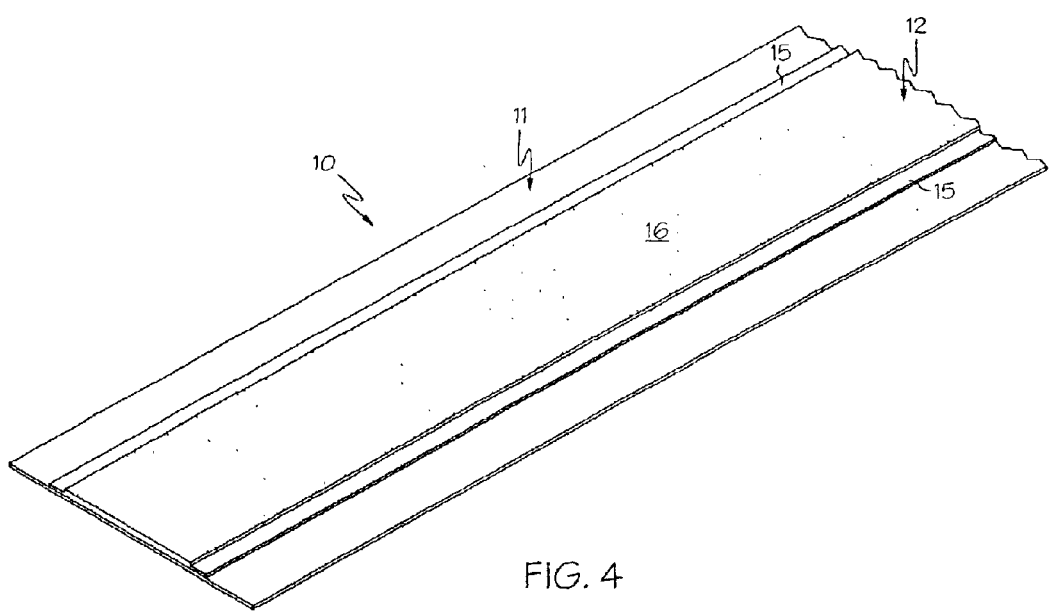
FIG. 4 is a schematic view of a laminate sheet according to one embodiment of the present invention.

FIG. 4 is a schematic illustration of one embodiment of a laminate sheet 10 according to the present invention. Sheet 10 is depicted as having an endless length, however it will be understood that the present invention is not so limited. Sheet 10 includes a film layer 11 (at least portions of which may be microporous) and a fabric layer 12. Fabric layer 12 is bonded to film layer 11 at high-bond regions (or lanes) 15 which extend lengthwise along sheet 10, adjacent the edges of fabric layer 12. In region 16 located between high-bond regions 15, the fabric layer may be either unbonded to film layer 11, or bonded to a lesser degree than regions 15. In fact, as used herein, the term "high-bond region" simply means that, in such area(s) of the laminate, the fabric layer is bonded to the film layer to a greater degree than in other regions of the sheet (in which other regions the fabric layer may or may not be bonded to the film layer).

It will also be noted from FIG. 4 that the film and fabric layers need not be co-extensive with one another. Therefore, in the embodiment shown, the width of the fabric layer 12 is less than the width of the film layer 11. However, it is also contemplated that the width of the fabric and film layers may be substantially the same, as desired. In addition, it may also be desirable in some instances to form a laminate sheet wherein the width of the fabric layer is greater than the width of the film layer. Furthermore, although laminate sheet 10 is depicted as having two high-bond regions (or lanes) which extend along the edges of fabric layer 12, any number and orientation of high-bond regions may be provided, as desired.

During manufacture, after the fabric layer has been bonded to the film layer in the manner described above, the resulting laminate sheet is stretched in at least one direction. If the film layer includes a pore initiator, the film layer may be rendered microporous during this stretching process, as described, for example, in U.S. Pat. No. 6,013,151. However, the high-bond regions of the laminate sheet remain either unstretched or are only partially stretched. The term "partially stretched" simply means that, although the high-bond regions of the laminate sheet may be stretched to some extent, these regions are stretched less than the other regions of the laminate sheet. The result of such selective stretching is that the benefits of stretching the laminate are achieved without adversely affecting the bond strength in the high-bond regions. This allows one to achieve the desired benefits of stretching the laminate while avoiding some of its drawbacks.

The film and fabric layers may be bonded to one another by any of a variety of methods, such as adhesive bonding, electromagnetic bonding, hot plate bonding and ultrasonic bonding. Alternatively, or in addition to one or more of the foregoing bonding methods, the fabric layer may be extrusion coated with the film.

Figure 1:
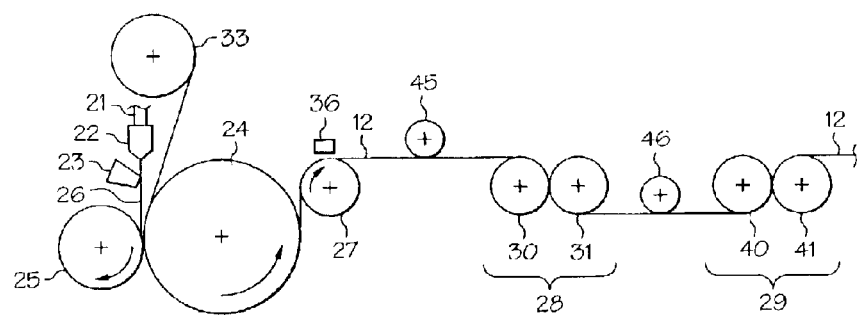
FIG. 1 is a schematic view of an apparatus for producing a laminate sheet according to one embodiment of the present invention.

FIG. 1 is a schematic illustration of one embodiment of an apparatus which may be used to produce the laminate sheet depicted in FIG. 4, wherein the film layer is a thermoplastic film and the fabric layer is a nonwoven fibrous web. In fact, the apparatus of FIG. 1 is similar to that shown and described in U.S. Pat. No. 6,013,151, with the addition of a mechanism for providing high-bond regions in the laminate sheet and the modification of at least one set of stretching rollers. Using the apparatus of FIG. 1, the thermoplastic film is laminated to the nonwoven fibrous web during extrusion by introducing the nonwoven web into the nip of a pair of rollers along with the thermoplastic extrudate. The resulting laminate sheet is then incrementally stretched across the width of the laminate (cross direction, or "CD", stretching). However, the high-bond regions are not stretched (or are only partially stretched). The laminate sheet also may be stretched in the machine direction ("MD" stretching), and/or diagonally stretched.

In order to produce a continuous laminate sheet such as that depicted in FIG. 4, the thermoplastic composition of the film layer is fed from an extruder 21 through slot die 22 to form the extrudate 26 (which corresponds to film layer 11 of the laminate sheet). Extrudate 26 is fed into the nip ("cast station nip") between a cast roll 24 (typically a metal roll) and a backup roll 25 (typically a rubber roll). An air knife 23 may be used to assist in the elimination of draw resonance, as described in, for example, U.S. Pat. No. 4,626,574. Alternatively, the air cooling devices described in U.S. patent application Ser. No. 09/489,095 (filed Jan. 20, 2000) may be employed to prevent draw resonance. A web of nonwoven fabric 12 from roller 33 is pulled into the cast station nip between rolls 25 and 24. In this nip, fabric 12 is extrusion coated with the molten film (or extrudate) 26 which has just exited the slot die 22. In essence, the fibers are embedded in, and encapsulated by the film during the extrusion lamination process.

A variety of techniques may be used to provide the high-bond regions in the laminate sheet. For example, melt temperature and nip pressure will often dictate the degree of intrusion of the fibers into the film, and hence the strength of the bond between the film and fabric layers. Increases in melt temperature and/or nip pressure generally increase the strength of the bond between the film and fabric layers. Thus, the degree of bonding achieved through the nip may be readily controlled. Furthermore, the degree of bonding may be varied across the width of the nip, such as by providing regions of the nip wherein the nip pressure is greater than other regions of the nip. In this manner, the high-bond regions may be provided in the laminate sheet.

Figure 2:
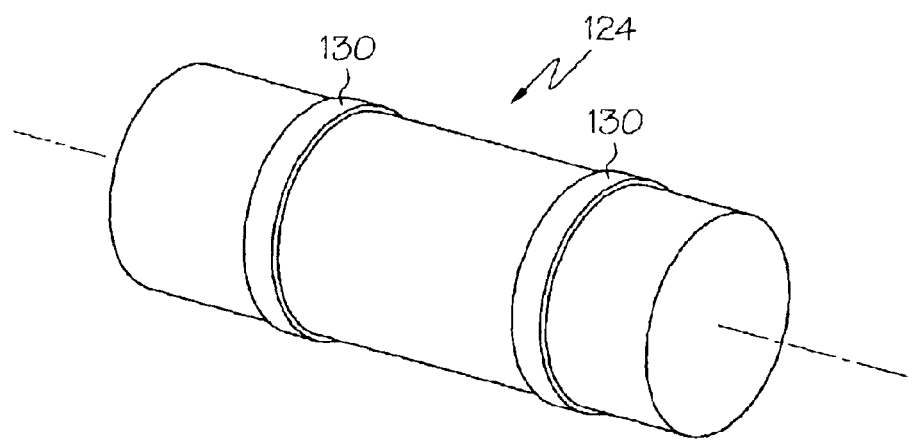
FIG. 2 is a schematic view of a metal cast roll which may be used in the apparatus of FIG. 1.
Figure 5:
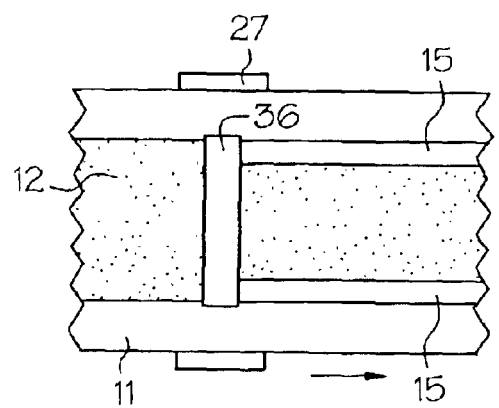
FIG. 5 is a top schematic view of the bonding station of the apparatus of FIG. 1.

By way of example, FIG. 2 is a schematic illustration of a modified metal cast roll 124. As shown in FIG. 2, cast roll 124 is generally cylindrical, however it includes two raised areas 130 which is extend about the circumference of cast roll 124 generally perpendicular to the longitudinal axis of cast roll 124. Raised areas 124 may be provided by any of a variety of means such as by wrapping tape (e.g., Teflon tape) around the circumference of cast roll 124. Alternatively, cast roll 124 may be engraved to create raised areas 130 on cast roll 124. The diameter of cast roll 124 at raised areas 130 is greater than the diameter of the remainder of cast roll 124 such that when cast roll 124 is used in the apparatus of FIG. 1, the nip pressure between cast roll 124 and backup roll 25 will be greater in the area between raised areas 130 and backup roll 25. In this manner, as the film and fabric layers pass through the nip, the increased nip pressure in these areas will result in the formation of high-bond regions in the resulting laminate sheet 22 leaving the nip. In fact, when raised areas 130 are provided on cast roll 124 in the manner shown in FIG. 2, the resulting laminate sheet will be similar to that shown in FIG. 4 (i.e., with two high-bond regions extending along the length of the laminate sheet adjacent the edges of the fabric layer).

As an alternative to providing the higher nip pressure regions described above in order to provide high-bond regions in the laminate sheet (or in addition thereto), a variety of other devices and techniques may be employed. For example, a bonding station may be provided immediately before or after the cast station nip, wherein the bonding station is configured to apply a bonding energy to selected areas of the laminate sheet entering or leaving the nip. Application of such bonding energy may include, for example, the selective application of heat and/or pressure. Bonding may even be accomplished by ultrasonic welding (e.g., using a sonic sealing device) wherein the application of vibrational energy to the laminate creates frictional heat which melts the layers at their interface and creates a bond. Of course it is also contemplated that the bonding station may be located before the nip and configured to selectively apply an adhesive (such as hot melt adhesive) to portions of the fabric layer and/or the film layer.

By way of example, and as shown in FIG. 1, one suitable bonding station may comprise one or more sonic sealing devices 36 positioned adjacent roller 27, and immediately downstream of the nip between rolls 24 and 25. Sonic sealing devices are well-known to those skilled in the art, and a rotary drum ultrasonic sealer may used as a sonic sealing device 36 and roller 27. Such a rotary drum ultrasonic sealer typically includes a vibrating horn adjacent a rotary drum (e.g., roller 27), configured such that the laminate may be continuously fed between the horn and the drum. The high frequency mechanical motion of the vibrating horn combined with the compressive force between the horn and the drum create frictional heat at the point where the horn contacts the laminate, thereby resulting in bonding of the two layers of the laminate at that location. In order that sonic sealing device only bonds the desired regions of the laminate (i.e., the high-bond regions), a pattern of raised areas may be machined into the drum at the desired bond locations. For example, in order to produce the laminate sheet of FIG. 4, sonic sealing device 36 may be configured such that the device only causes bonding in the narrow portions of the laminate sheet adjacent the edges of the fabric layer.

After the laminate sheet leaves the nip between rolls 24 and 25 and (when employed) the bonding station, the laminate sheet is then stretched at one or more stretching stations. In particular, the laminate sheet may be incrementally stretched by techniques well-known to those skilled in the art. However, at least one of the stretching stations, the high-bond regions of the laminate sheet are not stretched (or are only partially stretched). Any of a variety of stretching devices known to those skilled in the art may be employed to stretch the laminate sheet, such as the various stretchers described in U.S. Pat. No. 6,013,151. By way of example, a diagonal intermeshing stretcher, a cross direction (CD) intermeshing stretcher, and/or a machine direction (MD) stretcher may be employed.

A diagonal intermeshing stretcher generally comprises a pair of left hand and right hand helical gear-like elements on parallel shafts. In one embodiment, the shafts may be disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationary intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addenda of intermeshing teeth is avoided. If the intermeshing rolls are to remain in constant engagement, the upper intermeshing roll typically need not be driven. Drive may be accomplished by the driven intermeshing roll through the material being stretched.

As mentioned previously, the diagonal intermeshing rolls closely resemble fine pitch helical gears. In one, the rolls have 5.935" diameter, 45° helix angle, a 0.100" normal pitch, 30 diametrical pitch, 14.5° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

A CD intermeshing stretcher may be similar to the diagonal intermeshing stretcher with differences in the design of the intermeshing rolls and other minor areas noted below. Since the CD intermeshing elements are often capable of large engagement depths, it may be necessary for the equipment to incorporate a means of causing the shafts of the two intermeshing rolls to remain parallel when the top shaft is raising or lowering. This may be necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements may be machined from a solid material but can best be described as an alternating stack of two different diameter disks. In one embodiment, the intermeshing disks would be 6" in diameter, 0.031" thick, and have a full radius on their edge. The spacer disks separating the intermeshing disks would be 5 1/2" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch. Alternatively, the CD intermeshing rollers may comprise cylindrical rollers having a series of annular rings extending about the circumference of the rollers (as further described herein).

An MD intermeshing stretcher may also be similar to the diagonal intermeshing stretcher except for the design of the intermeshing rolls. The MD intermeshing rolls closely resemble fine pitch spur gears. In one embodiment, the rolls have a 5.933" diameter, 0.100" pitch, 30 diametrical pitch, 14.5° pressure angle, and are basically a long addendum, topped gear. With about 0.090" of engagement, this configuration will have about 0.010" clearance on the sides for material thickness.

The above described diagonal, CD and/or MD intermeshing stretchers may be employed in the methods of the present invention. However, at least one of the stretchers is configured such that the high-bond regions of the laminate sheet are not stretched (or are only partially stretched) by this stretcher. In the embodiment of FIG. 1, a CD intermeshing stretcher is provided at first stretching station 28, and a MD intermeshing stretcher is provided at second stretching station 29. As further described herein, the CD intermeshing stretcher is configured such that the high-bond regions of the laminate sheet are not stretched at the first stretching station (or are only partially stretched). In addition, temperature controlled rollers 45 and 46 may be provided before the first and second stretching stations, as desired, in order to heat the laminate prior to stretching.

Figure 3:
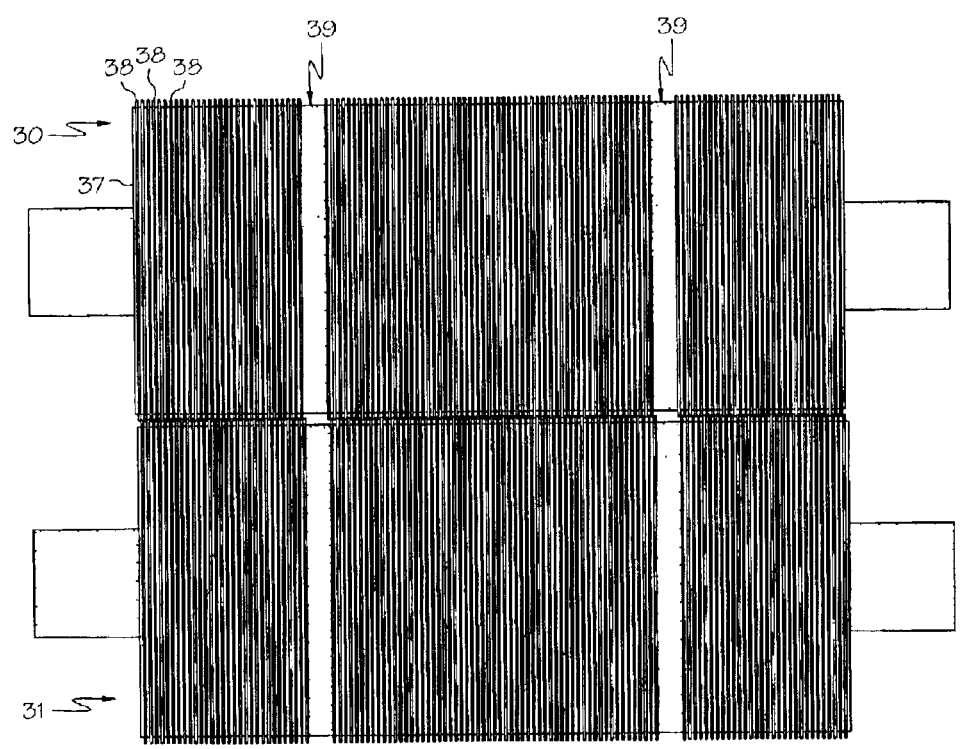
FIG. 3 is a schematic view of a pair of CD intermeshing ring rollers according to one embodiment of the present invention.

The CD intermeshing stretcher at first stretching station 28 generally comprises incremental stretching rollers 30 and 31. While stretching rollers 30 and 31 may be of any of a variety of configurations, FIG. 3 is a schematic view of one exemplary embodiment of CD Intermeshing ring rollers 30 and 31. Each ring roller essentially comprises a cylindrical roller 37 and a plurality of annular rings 38 secured to the outer circumference of cylindrical roller 37. Annular rings 38 are generally evenly spaced along the length of cylindrical roller 37, however the rings on stretching roller 30 are offset from the rings on stretching roller 31 such that when the rings are brought together in the manner shown in FIG. 3, the rings of stretching roller 30 will be intermeshed with the rings of stretching roller 31. In this manner, as the laminate sheet is passed between stretching rollers 30 and 31, the laminate sheet will be stretched in the cross direction (i.e., perpendicular to the machine direction in the apparatus of FIG. 1).

In order to ensure that the CD intermeshing stretcher shown in FIG. 3 does not stretch (or only partially stretches) the high-bond regions of the laminate sheet, rings 38 are not present in those regions of cylindrical rollers 37 which correspond to the high-bond regions of the laminate sheet (see FIG. 3). Thus, as shown in FIG. 3, gaps 39 are provided on stretching rollers 30 and 31, wherein the annular rings 38 are not present in gaps 39. In this manner, as the laminate sheet passes between stretching rollers 30 and 31, the high-bond regions of the laminate sheet will pass through gaps 39 and will therefore not be stretched by the intermeshing annular rings 38 (or will only be partially stretched due to the intermeshing rings adjacent gaps 39).

In the exemplary embodiment of FIG. 1, after passing through the CD ring rollers, the composition moves through a pair of MD Intermeshing rollers 40 and 41. MD intermeshing rollers 40 and 41 may also be configured to include gaps wherein there are no intermeshing elements to stretch the high-bond regions of the laminate sheet. Alternatively, the conventional MD intermeshing rollers may be employed such that the entire laminate sheet is stretched in the machine direction (including the high-bond regions). Applicants have found that allowing the high-bond regions to be stretched in the machine direction but not stretched (or only partially stretched) in the cross direction nevertheless provides improved properties for the laminated sheet. After leaving the second stretching station, the laminate sheet may be wound onto rolls (such as by using a rewinder, not shown).

As an alternative to roller configuration of FIG. 3 for preventing the stretching of the high-bond regions, the apparatus of U.S. Pat. No. 6,265,045 ("the '045 patent", which is incorporated herein by reference) may be used, wherein the apparatus of the '045 patent is configured such that the high-bond regions of the laminate of the present invention correspond to the unstretched "slack" areas (as that term is defined in the '045 patent).

The apparatus and methods of the present invention are particularly suited to producing incrementally-stretched laminate sheets comprising a microporous film layer and a fabric layer. The film composition which is extruded into the nip may include filler particles (pore initiator) such that, when the laminate sheet is stretched, micropores will be formed in the film layer at the locations of the filler particles.

The fabric layer may comprise, for example, a nonwoven fibrous web of staple fibers or spun-bonded filaments. In addition, the incremental stretching provided by one embodiment of the present invention provides a very soft fibrous finish to the composite that looks like cloth. The results of such incremental or intermesh stretching produces composites that have excellent breathability and liquid-barrier properties, yet provide soft cloth-like textures. In addition, since the laminate sheet includes one or more high-bond regions which are not stretched (or are only partially stretched), the other regions of the sheet which are either unbonded or bonded less than the high-bond regions may be stretched to a greater degree than might otherwise be possible.

A. Materials for the Composite

Processes for the production of microporous films are well known in the art. The film is produced by blending finely divided particles of an inorganic filler (such as calcium carbonate or other salt) into a suitable polymer, forming a film of the filled polymer, and stretching the film to provide good microporosity and breathability.

A microporous film is often characterized by the size of the pores present. Pores with equivalent diameters in the range of 0.01 to 0.25 microns are known to prevent the flow of non-wetting liquids. If the frequency of these pores is sufficiently high, the material will allow a reasonable passage of water vapor while maintaining an effective barrier to liquid water.

The film layer of the laminate according to one embodiment of the present invention comprises a polyolefin-based composition, such as one or more polypropylenes, polyethylenes, functionalized polyolefins, or combinations thereof. For example, one formulation for the film layer according to one embodiment of the present invention may be obtained by first melt blending a composition comprising:

(a) about 35% to about 45% by weight of a linear low density polyethylene,
(b) about 3% to about 10% by weight of a low density polyethylene,
(c) about 40% to about 60% by weight calcium carbonate filler particles, and
(d) about 1% to about 10% by weight of one an additive comprising one or more components chosen from the group consisting of: pigments, processing aids, antioxidants, and polymeric modifiers.

The above composition may be extruded into the nip between rollers 24 and 25, as described previously in order to form a film at a speed of about 550 fpm to about 1200 fpm, without draw resonance. The fabric layer is fed into the nip along with the extrudate, and the resulting laminate sheet is then incrementally stretched at the same speed along lines substantially uniformly across said film and throughout its depth to provide a laminate sheet having a microporous film layer and a fabric layer. The resulting film layer may have a basis weight of between about 10 and about 40 gsm, more particularly between about 20 and about 30 gsm. The fabric layer may have a basis weight of between about 10 and about 30 gsm, more particularly between about 15 and about 25 gsm. The WVTR of the laminate may be greater than about 500 grams per square meter per day and a hydrohead in excess of 60 cm (measured as the minimum height of a column of water that generates leakage in the laminate).

One particular film composition may comprise about 42% by weight LLDPE, about 4% by weight LDPE, and about 44% by weight calcium carbonate filler particles having an average particle size of about 1 micron. If desired, the stiffness properties of the microporous film products may be controlled by including high density polyethylene on the order of about 0–5% by weight. The film color (whiteness) can be controlled by including 0–4% by weight titanium dioxide. A processing aid such as a fluorocarbon polymer in an amount of about 0.1% to about 0.2% by weight may be added, such as 1-propene,1,1,2,3,3,3-hexafluoro copolymer with 1,1-difluoroethylene. Antioxidants such as Irganox 1010 and Irgafos 168 may also be added at a total concentration of 500–4000 ppm.

Suitable fabric layers include natural or synthetic fibers or filaments, which are bonded or otherwise consolidated into a web structure. Fabrics are generally classified as either woven or nonwoven. Woven fabrics are often produced by first spinning these individual fibers into thread which is then consolidated by either weaving or knitting operations. Nonwoven fabrics are produced in single or multiple steps. An example of a single step nonwoven process is spunbonding wherein thermoplastic resin is extruded through small orifices, drawn, and deposited on a moving belt for later post treatments like thermal embossing. An example of a multiple step nonwoven process is where thermoplastic fibers are preformed, carded, and then thermally point bonded. These are two of many processes that could be used to produce a nonwoven fabric layer suitable for use in manufacturing the composites of the present invention. For a detailed description of nonwovens see "Nonwoven Fabric Primer and Reference Sampler" by E. A. Vaughn, Association of the Nonwoven Fabrics Industry, $3^{rd}$ edition (1992). Exemplary fabrics which may used include spunbond polypropylene, spunbond polyethylene, and carded, thermal bonded polypropylene.

The properties of laminate sheets produced according to the present invention may be tested in a variety of manners. For example, the water vapor transmission rate ("WVTR") may be determined in accordance with ASTM E 96, "Standard Test Methods for Water Vapor Transmission of Materials." A known amount of desiccant is put into a cup-like container along with the sample and held securely by a retaining ring and gasket. The assembly is placed in a constant temperature (40° C.) and humidity (75% RH) chamber for 5 hours. The amount of moisture absorbed by the desiccant is determined gravimetrically and used to estimate the WVTR (units of $g/m^2 \cdot 24$ hr) of the sample.

ASTM E 1294-89: "Standard Test Method for Pore Size Characteristics of Membrane Filters using Automated Liquid Porosimeter" was used to measure the maximum pore size (MPS). This method measures the MPS (units of microns) for microporous films and nonwoven composites using a liquid displacement technique that depends on the capillary rise created by the surface tension and uses the Washburn equation for calculating the pore diameter.

The strength of the bond between the film and fabric layers was measured using the Clopay Bond Strength test (HCTM-08) which measures the tensile force required to separate component layers of a bonded or laminate construction. This test employs an Instron Model 4301 (Instron Corporation, Canton, Mass.) or equivalent device. Specimens are prepared by cutting one inch by seven inches (1"×7") strips with the longer dimension in the cross direction from the structure to be tested. The layers to be evaluated are separated for a distance of one (1) inch in the long (seven inch—7") dimension. The gauge length (initial jaw separation) is set to 1"±⅓₂". The crosshead speed is set to 12" per minute. A separated layer of each test specimen is clamped in the upper jaw of the testing machine so that the specimen is centered with the longitudinal axis at right angles to the clamping surface. The matching layer is clamped in the lower 1.5" jaw of the testing machine in a similar fashion. Start the crosshead. Any specimen that does not delaminate over the full range of load determination is designated "TB", for total bond. In other words, "TB" means that the fabric will eventually tear before delamination occurs.

The number of pinholes in the laminate sheet was determined using Clopay Pinhole Test method (HCTM-02) which measures the resistance of coated and laminated fabrics to the penetration of an alcohol solution (100 ml of 70% Isopropyl alcohol with 1.0 ml of red food color dye). This test is conducted by exposing approximately six square feet of composite to 72 ml of the solution onto the film side of the sample. The solution is evenly spread with a brush to cover the marked off area of the sample. The solution is allowed to rest for ten minutes, then patted dry with napkins. The sample is turned over and the dye marks are counted. The number of pinholes in the tested area are reported.

The following examples illustrate one method of making film/nonwoven composites according to one embodiment of the present invention. In light of these examples and this further detailed description, it is apparent to a person of ordinary skill in the art that variations thereof may be made without departing from the scope of this invention. The listing of these examples is provided merely to show one skilled in the art how to apply the principals of this invention as discussed herein. These examples are not intended to limit the scope of the claims appended to this invention.

In the following examples, an apparatus similar to that shown in FIG. 1 was employed. In the first example, sonic sealing devices were employed to provide high-bond regions. In the second example, sonic sealers were not employed. Instead, Teflon tape (0.5 inches wide by 10 mils thick) was wrapped around the metal cast roll 24 (as shown in FIG. 2) so as to provide zones where, due to the added thickness of the tape, the nip pressure was increased.

EXAMPLE 1

A film formulation containing 50% calcium carbonate, 47% polyethylene resin, and 3% titanium dioxide was extruded using standard cast film equipment and process conditions. A 20 g/m² ("gsm") thermal point bonded, carded, polypropylene web was thread from the unwind into the cast station nip so that it contacted the molten film stream during run conditions. The extruder speed and line speed was set so that a 35 g/m² film layer was added to the fabric. The film/fabric composite then passed into the sonic sealing unit where two one half inch wide wheels contacted the composite and create bonded zones near each edge (similar to FIG. 4). The composite with its bonded lanes then passed through the CD Intermeshing ring rollers (at a temperature of 215 deg. F). The ring rollers had rings every 0.100 inches except at the locations where the bonded lanes fall. The composite was also MD stretched at room temperature.

The physical property results shown in Table 1 represent typical data for three prototypes compared with the desired specification limits. All three prototypes were produced using the same raw materials. Sample 1A was produced as a control with standard extrusion coating of film onto fabric followed by a standard CD ring roller with no spaces, then the MD ring roller, before being rewound. There was no sonic sealing unit. Sample 1B was like 1A except for the addition of the sonic sealing unit. The CD ring roller unit had no spaces. Sample 1C was run as described in this disclosure utilizing both the sealing unit and the special CD ring rollers with spaces to avoid stretching the high-bond regions. Note that Sample 1A had marginal breathability and unacceptable bond delamination strength. Sample 1B had acceptable properties except for pinholes, which occurred where the high-bond regions contacted the ring rollers. Sample 1C had all acceptable results based upon the improvements described herein.

TABLE 1

| Prototype Description | MVTR (g/m² · 24 hr) | Bond Strength (g/in) | Pinhole Count (# per m²) |
|---|---|---|---|
| #1A - Control, Extrusion coated, standard CD + MD Intermeshing | 2200 | 50 | 0 |
| #1B - Extrusion Coated, Zone bonded, standard CD + MD Intermeshing | 3500 | TB* | 10 |
| #1C - Extrusion Coated, Zone Bonded, CD Intermeshed with spacers + MD | 3500 | TB* | 0 |

*TB = Total bond, where fabric breaks before delaminating from film. Bond strength was measured in the high-bond regions of the composite.

In the above examples, since prototypes 1B and 1C exhibited total bond, it was possible to stretch these composites (in the CD direction) to a deeper engagement than 1A. This resulted in significant improvements in the MVTR. The engagement depth for prototype 1A, however, could not be increased because of the unacceptable bond strength.

EXAMPLE 2

In this example, Teflon tape (0.5 inches wide by 10 mils thick) was wrapped around the cast roll so as to provide a zone where the tape would contact the film and fabric with more pressure than the remainder of the sheet during extrusion coating. A 6 inch wide strip of 20 g/m² thermally bonded, carded polypropylene nonwoven was fed into the extrusion nip so that the areas wrapped with Teflon tape contacted the web at each edge. A microporous-formable film was extruded into the nip, where it coated the fabric. The film was therefore full width (1 meter) with the fabric present only as a 6 inch wide strip down the middle. The Teflon tape resulted in higher bonded areas at the edges of the fabric, leaving 5 inches in the middle of the fabric with lower bond. The composites were CD stretched and MD stretched after bonding, avoiding the bonded zones in the CD stretching, in order to activate the microporous film (i.e., render the film microporous due to the presence of the filler. To show the relationship between bond strength and physical properties, this trial was conducted using one wrap of Teflon tape, then two, and finally three. The end result was a change in the offset distance between cast and nip rolls of 10 mils in sample 2A, 20 mils in sample 2B, and 30 mils in sample 2C.

The data in Table 2 demonstrates that higher MVTR can be achieved without pinholes for samples that are lightly bonded since higher engagement depths can be utilized without damaging the composite. This knowledge, combined with a method of achieving the minimum possible bonding by zone bonding, provides an improved method of producing a composite with excellent vapor breathability, barrier properties, and aesthetics.

TABLE 2

| Prototype Description | Teflon Tape Thickness (inch) | CD Intermesh Engagement (inch) | MVTR (g/m² · 24 hr) | Pinhole Count (# per m²) |
|---|---|---|---|---|
| #2A –Zone bonded, Extrusion coated, standard CD + MD Intermeshing | 0.010 | 0.050 | 950 | 0 |

TABLE 2-continued

| Prototype Description | Teflon Tape Thickness (inch) | CD Intermesh Engagement (inch) | MVTR (g/m² · 24 hr) | Pinhole Count (# per m²) |
|---|---|---|---|---|
| #2A –Zone bonded, Extrusion coated, standard CD + MD Intermeshing | 0.010 | 0.060 | 2200 | 10 |
| #2B –Zone bonded, Extrusion coated, standard CD + MD Intermeshing | 0.020 | 0.050 | 2100 | 0 |
| #2B –Zone bonded, Extrusion coated, standard CD + MD Intermeshing | 0.020 | 0.060 | 2400 | 15 |
| #2C = –Zone bonded, Extrusion coated, standard CD + MD Intermeshing | 0.030 | 0.050 | 1000 | 0 |
| #2C = –Zone bonded, Extrusion coated, standard CD + MD Intermeshing | 0.030 | 0.06 | 2100 | 0 |
| #2C = –Zone bonded, Extrusion coated, standard CD + MD Intermeshing | 0.030 | 0.070 | 3100 | 0 |
| #2C = –Zone bonded, Extrusion coated, standard CD + MD Intermeshing | 0.030 | 0.080 | 3300 | 8 |

What we claim is:

1. A method of making a laminate sheet comprising a film layer and a fabric layer, comprising:
   (a) bonding a film layer to a fabric layer in order to form a laminate sheet, wherein said laminate sheet includes at least one high-bond region whereat the strength of the bond between the film and fabric layers is greater than other regions of the laminate sheet; and
   (b) selectively stretching said laminate sheet using an intermeshing stretcher such that said high-bond regions are either not stretched or are only partially stretched.

2. The method of claim 1, wherein said film layer is formed from a thermoplastic composition, and said step of bonding the film layer to the fabric layer comprises extruding said thermoplastic composition onto said fabric layer.

3. The method of claim 2, further comprising the step of thermally bonding at least one region of said laminate sheet in order to provide said at least one high-bond region.

4. The method of claim 3, wherein said step of thermally bonding is accomplished by sonic sealing or thermal point bonding.

5. The method of claim 2, further comprising the step of adhesively bonding at least one region of said laminate sheet in order to provide said at least one high-bond region.

6. The method of claim 2, wherein said thermoplastic composition is extruded into a cast roll nip station along with said fabric layer, wherein said cast roll nip station includes a pair of rollers having a nip therebetween, at least one of said rollers having raised portions which increase the nip pressure adjacent said raised portions to thereby provide said high-bond regions.

7. The method of claim 2, wherein said thermoplastic composition is polyolefin based, containing from 40 to 60% calcium carbonate, surface coated with a fatty acid, 1 to 10% other additives such as pigments, antioxidants, and processing aids, with the remainder composed of polypropylenes, polyethylenes, functionalized polyolefins, or combinations of the above.

8. The method of claim 1 wherein the basis weight of the film is between about 10 and about 40 gsm, and most preferably between about 20 and about 30 gsm.

9. The method of claim 1 wherein said fabric layer is a polyolefin based nonwoven material.

10. The method of claim 9, wherein said fabric layer is chosen from the group consisting of: spunbond polypropylene; spunbond polyethylene; and carded, thermal bonded polypropylene.

11. The method of claim 9, wherein the fabric basis weight is between about 10 and about 30 gsm, and most preferably between about 15 and about 25 gsm.

12. The method of claim 1 wherein said composite has a water vapor transmission rate of greater than about 500 grams per square meter per day and a hydrohead in excess of 60 cm.

13. A method of making a diaper backsheet, comprising the steps of:
   (a) bonding a film layer to a fabric layer in order to form a laminate sheet, wherein said laminate sheet includes at least one high-bond region whereat the strength of the bond between the film and fabric layers is greater than other regions of the laminate sheet; and
   (b) selectively stretching said laminate sheet using an intermeshing stretcher such that said high-bond regions are either not stretched or are only partially stretched.

14. An incrementally and selectively stretched laminate of a polymeric film and a fabric web, comprising:
   (a) a polymeric film; and
   (b) a fabric web bonded to said film, wherein said laminate has at least one high-bond region whereat the strength of the bond between the film and fabric layers is greater than other regions of the laminate sheet;
   wherein said at least one high-bond region is either unstretched or is only partially incrementally stretched.

15. The laminate of claim 14, wherein said film is microporous.

16. The laminate of claim 14, wherein said laminate is incrementally stretched in the cross-machine direction.

17. The laminate of claim 14, wherein the polymeric film comprises:
   (a) a polyolefin; and
   (b) a pore initiator.

18. The method of claim 1, wherein said laminate is stretched in the cross-machine direction using an intermeshing stretcher.

19. The laminate of claim 14, wherein said at least one high-bond region is unstretched.

* * * * *